Aug. 24, 1948.  E. L. KENT ET AL  2,447,863

VIBRATION INDICATING APPARATUS

Filed May 9, 1944

Inventors:
Robert C. Preseder
and Earle L. Kent,
By Joseph A. Hazell
and Wade Koovy
Attorneys Patented Aug. 24, 1948

2,447,863

UNITED STATES PATENT OFFICE 2,447,863

VIBRATION INDICATING APPARATUS

Earle L. Kent, Elkhart, Ind., and Robert C. Treseder, Dayton, Ohio; said Kent assignor to C. G. Conn, Ltd., Elkhart, Ind., a corporation of Indiana Application May 9, 1944, Serial No. 534,832

2 Claims. (Cl. 177—351)

The invention described herein may be manufactured and used by or for the Government for governmental purposes, without the payment to us of any royalty thereon.

This invention relates to vibration indicating apparatus and more particularly to the indication of the amplitude and frequency of vibration of a vibrating member.

Vibrations of various types have heretofore been indicated by employing a vibrating reed or the like which vibrates in resonance with the vibrations to be measured or which remains relatively fixed in space while other parts of the apparatus vibrate around it. In devices of this type it has been difficult to indicate the amplitude and frequency of vibrations of the member without interfering with its free movement and it is one of the objects of the present invention to provide vibration indicating method and apparatus in which freedom of vibrating member is not interfered with.

Another object of the invention is to provide vibration indicating apparatus in which the vibrations are indicated by means of a light beam variably controlled by the vibrating member.

Still another object of the invention is to provide vibration indicating apparatus in which a light beam controlled by the vibrating member regulates the admission of light to a photo-sensitive generating device to generate a voltage proportional to the amplitude and frequencies of vibration.

Still another object of the invention is to provide vibration indicating apparatus in which a photo-sensitive generating device is variably lighted under the control of a vibrating member to generate an alternating current proportional to the amplitude and frequency of the vibrations of the member.

The above and other objects and advantages of the invention will be more readily apparent from the following description when read in connection with the accompanying drawing, in which—

Figure 1:
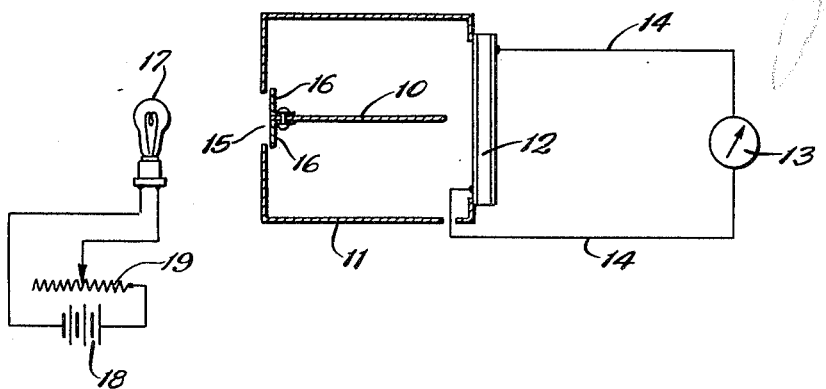
Figure 1 is a diagrammatic sectional view of one form of apparatus embodying the invention.

The apparatus shown in Figure 1 comprises a vibrating reed 10 which may be tuned to resonance with the vibrations to be measured or which may be out of resonance therewith to remain relatively fixed in space while the remainder of the apparatus vibrates around it. The reed is enclosed in a casing 11 having an opening at one side in which a photo-voltaic cell 12 is mounted. The cell 12 is arranged in the opening with its sensitive side in and lying in a plane parallel to the plane of vibrations of the reed. The cell may be connected as shown to a voltage indicating device such as a milliammeter 13 connected through wires 14 to the opposite sides of the cell.

The casing is formed with a relatively smaller opening 15 opposite the cell and which is normally blocked by flanges or vanes 16 carried by the reed 10. The flanges 16 are preferably of such a size that when the reed 10 is in its neutral position, they completely block the opening 15 but when the reed is vibrating even a relatively small amount, the flanges will move more or less out of register with the opening.

Light is supplied to the opening from any suitable source outside of the casing indicated as a conventional electric lamp 17. The lamp 17 is energized from a conventional electric source shown as a battery 18 connected to the lamp through an adjustable rheostat 19.

In operation with the reed 10 in the neutral position and the lamp lighted none of the light from the lamp can reach the cell 12 so that no voltage will be generated thereby. The light intensity can be adjusted by depressing the reed a predetermined amount so that a known amount of light can pass through the opening 15 to strike the cell. The rheostat 19 can then be adjusted until the meter 13 reads a predetermined value at which time the apparatus is ready for operation. As the reed vibrates the flanges 16 will move out of register with the opening 15 twice during each cycle of vibration of the reed to admit light from the lamp 17 to the cell. It will be noted that the amount of light admitted depends upon the amplitude of vibration of the reed and that the time interval between the light admissions depends upon the frequency of vibration of the reed.

Figure 2:
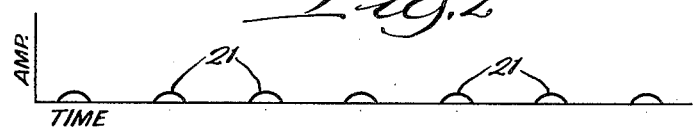
Figure 2 is a graph illustrating the character of the voltage generated by the apparatus of Figure 1.

Under these conditions the cell will generate a voltage as indicated in Figure 2 in which amplitude is plotted against time. The generated voltage will appear in the form of a series of spaced positive pulses shown at 21 which will be impressed on the meter 13. Preferably the meter has sufficient inertia so that it will not follow the pulses but will indicate the average value of the pulses over a period of several cycles of vibration of the reed. Thus the meter will give a direct indication of the product of the amplitude and frequency of the vibration.

Figure 3:
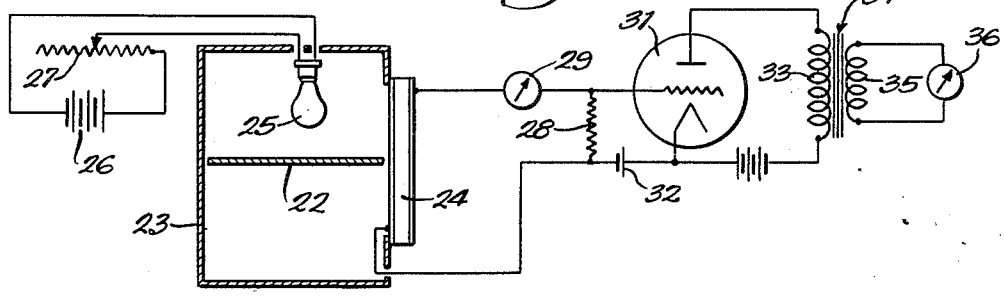
Figure 3 is a view similar to Figure 1 of another form of apparatus.

In the apparatus of Figure 3, a similar reed 22 is mounted in a casing 23 and a photo-voltaic cell 24 is mounted in one side thereof. An electric lamp 25 is mounted in the casing above the reed and is variably energized from a battery 26 through a rheostat 27.

The cell is connected across a resistance 28 with a voltage sensitive device such as a milliammeter 29 connected in the circuit. The resistance 29 is connected to the grid of a vacuum tube 31, a blocking condenser 32 being provided in the connection of the resistance to the cathode to block out direct current. The plate circuit of the tube is connected to the primary winding 33 of a transformer 34 whose secondary winding 35 is connected to a voltage sensitive device such as a milliammeter 36.

In operation of this circuit a portion of the cell 24 is always exposed to the light so that a constant direct current will be generated thereby when the reed is in its neutral position. This direct current is indicated by the dotted line 37 in Figure 4 and may be adjusted to any desired value as indicated on the meter 29 by adjusting the rheostat 27.

Figure 4:
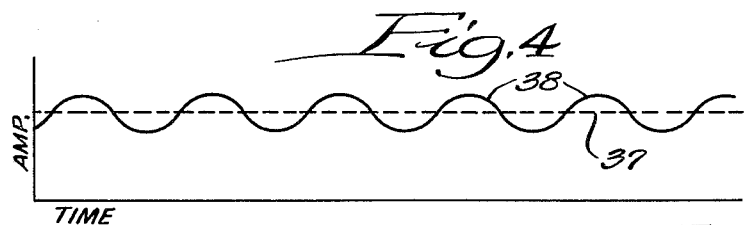
Figure 4 is a graph illustrating the voltage generated by the apparatus of Figure 3.

As the reed vibrates more or less of the cell will be exposed to the light source to generate an alternating current as indicated by the line 38 in Figure 4 about the line 37 as an axis. The output of the cell will be impressed on the grid circuit of the vacuum tube 31 across the resistance 28, the direct current component being blocked by the condenser 32. The plate current of the tube which is impressed on the transformer primary 33 will therefore be an amplified version of the alternating current wave 38. The transformer secondary current or voltage as indicated on the meter 36 will therefore be directly proportional to the product of the amplitude and frequency of vibration of the reed 22.

While two embodiments of the invention have been shown and described herein in detail, it will be understood that these are illustrative only and are not intended as definition of the scope of the invention, reference being had for this purpose to the appended claims.

What is claimed is:

1. Vibration indicating apparatus comprising a casing, a vibratory member in the casing, a photo-sensitive voltage generating device mounted in the casing at one side of the vibratory member and parallel to the plane of vibration thereof, the casing having an opening therein adjacent the other side of the member and which is blocked by the member in its neutral position and variably opened as the member moves away from its neutral position to admit light to said device, and means to indicate a function of the voltage generated by the device.

2. Vibration indicating apparatus comprising a casing, a vibratory member in the casing, a photo-sensitive voltage generating device mounted in the casing at one side of the vibratory member and parallel to the plane of vibration thereof, the casing having an opening therein adjacent the other side of the memebr and which is blocked by the member in its neutral position and variably opened as the member moves away from its neutral position to admit light to said device, and a voltmeter connected to the device to indicate the average value of the voltage generated thereby over several vibratory cycles of the member.

EARLE L. KENT.
ROBERT C. TRESEDER.

REFERENCES CITED

The following references are of record in the file of this patent:

UNITED STATES PATENTS

| Number | Name | Date |
|---|---|---|
| 1,514,123 | Bacevicz | Nov. 4, 1924 |
| 2,141,175 | Dawson | Dec. 27, 1938 |
| 2,149,735 | Henderson | Mar. 7, 1939 |
| 2,206,852 | Poupitch | July 2, 1940 |
| 2,348,711 | Chappell | May 16, 1944 |
| 2,406,982 | Zworykin | Sept. 3, 1946 |

FOREIGN PATENTS

| Number | Country | Date |
|---|---|---|
| 411,775 | Great Britain | June 14, 1934 |

OTHER REFERENCES

"Modern Aids to Vibration Study," by E. H. Hull, Journal of Applied Mechanics, vol. 4, pages A-151 to A-155 Dec. 1937.